April 16, 1935.  B. F. BERGMAN  1,997,962
COLLAPSIBLE TUBE CONTAINER
Filed July 24, 1934
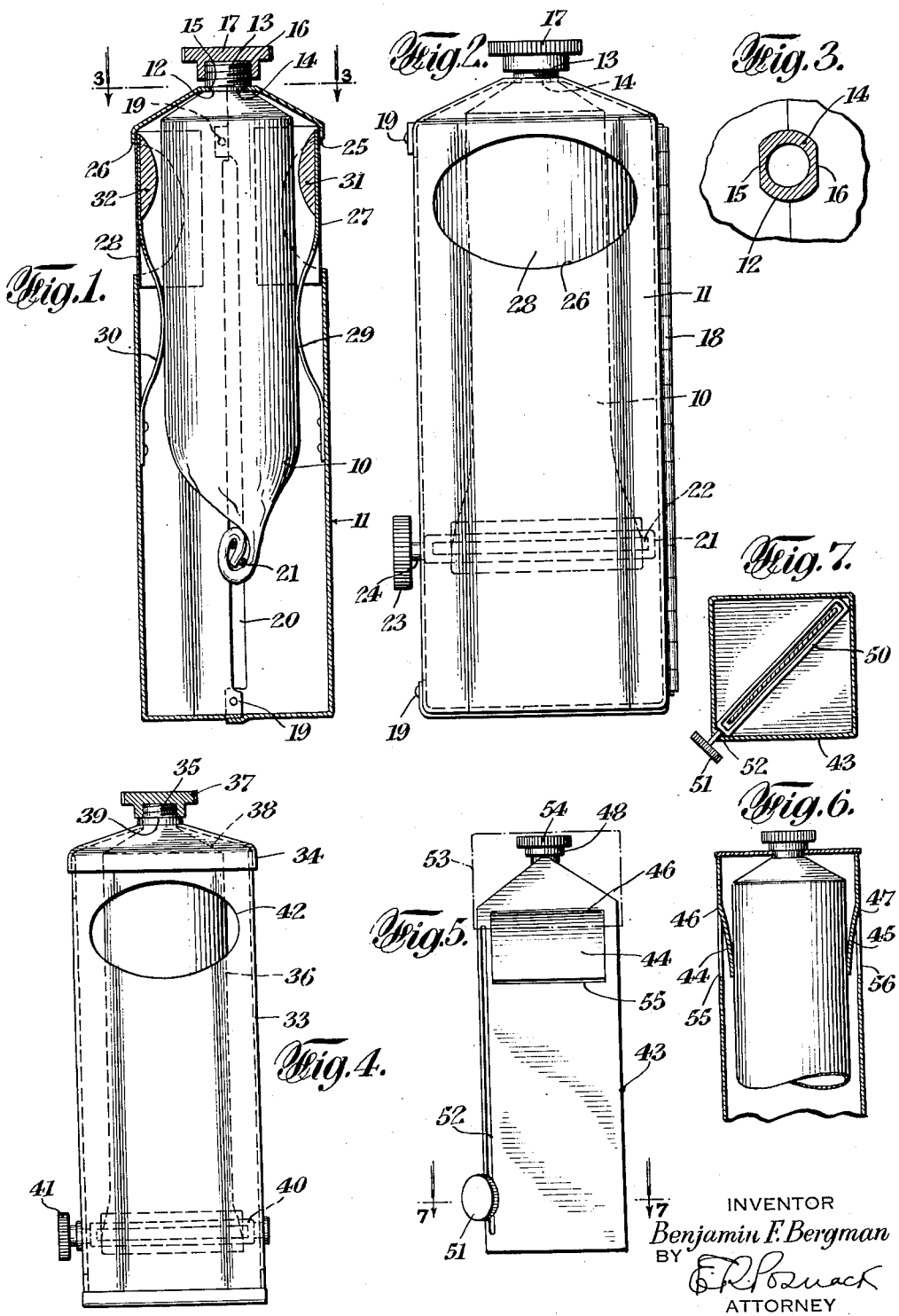
INVENTOR
Benjamin F. Bergman
BY
ATTORNEY Patented Apr. 16, 1935

1,997,962

UNITED STATES PATENT OFFICE 1,997,962

COLLAPSIBLE TUBE CONTAINER

Benjamin F. Bergman, Brooklyn, N. Y.

Application July 24, 1934, Serial No. 736,655

5 Claims. (Cl. 221—60)

This invention relates to collapsible tube containers, particularly of the type adapted to both house the tube and permit an operative manipulation thereof for effecting the ejection of the contents therefrom.

It is universally known that a tooth paste or shaving cream tube, or one containing any other ingredients, becomes pressed out of shape and badly distorted after some use, so that it not only presents an unsightly appearance but also becomes inconvenient and messy to handle. Furthermore, with continued use, the tube becomes more mutilated and disfigured, thereby hiding and obliterating from view the wording and printed subject matter contained thereon, in this manner progressively diminishing the advertising value of the tube to the manufacturer or distributor thereof. It is with the main purpose in view of overcoming these objections and disadvantages that I have conceived this invention whereby a collapsible tube is enabled to be neatly housed during its useful life, the arrangement being such as to permit the contents thereof to be easily and readily ejected by manual manipulation without removing the tube from its housing, and without in any way mutilating the sides of the container or affecting the free exposure of the outer surface thereof to view. And it is another object of my invention to accomplish this purpose by employing a container adapted to be set and maintained at all times in an upright position, and one that is of both simple and inexpensive structure.

It is still a further object of my invention, in certain forms thereof, to enable a tube to be readily inserted and removed from its housing, and in a particular form thereof, to permit a tube only of predetermined design to be operatively inserted within the container.

Another object of my invention is to facilitate the operation of ejecting the contents of a tube, in a device of this class, by providing means to keep the tube filled at all times at the point thereof where manual pressure is applied for the squeezing out of said contents.

Other objects, features and advantages will appear from the drawing and the description hereinafter given.

Referring to the drawing,

Figure 1 is a vertical section showing a tube positioned within the casing of a preferred form of my invention.

Figure 2 is a side view of the device of Figure 1.

Figure 3 is a fragmentary sectional plan taken along line 3—3 of Figure 1.

Figure 4 illustrates another form of my invention.

Figure 5 is an elevation of still another modification of this invention, showing a paper container with flaps formed from the lateral sides thereof, the cover for the container being shown in dot-dash lines.

Figure 6 is a fragmentary vertical section of the device of Figure 5, and

Figure 7 is a section of Figure 5 taken along line 7—7.

In the drawing the tube 10 is positioned within the casing 11 which contains a top opening 12 for accommodating the threaded outlet terminal portion 13 of the tube. In this form of my invention the said terminal 13 is shown with a reduced neck portion 14 formed by the two parallel flat sides 15 and 16, thereby creating two recesses into which the two corresponding edges of said opening 12 are adapted to fit. This arrangement prevents both a rotary and vertical displacement of the tube within the container. It is of course understood that the said recesses can be made of any predetermined shape, and the edges of the opening 12 correspondingly formed to fit the said neck portion. The operative position of the cap 17, which comes with the tube, remains at all times unaffected by this arrangement.

The casing 11 shown in Figure 1 consists of two sections secured together at one side by the hinge construction 18, and detachably held together at the other side by a suitable latch 19. In a lateral side of the casing, preferably positioned opposite the hinge 18, is the vertical slot 20, and extending through this slot is the key 21 the inner portion of which has a slot 22 and the outer portion the knob 23 for manual manipulation. The shank 24 of the key is so dimensioned as to be frictionally movable within slot 20; and the slot 22 of the key is adapted to receive the lower terminal portion of the tube 10 for operative engagement therewith.

The upper portion of the casing is provided with apertures 25 and 26, these being covered by the flexible diaphragms 27 and 28 suitably secured to the walls of the casing. The springs 29 and 30 are attached to the inner walls of the casing and are in constant engagement with the inner surfaces of said diaphragms so as to normally keep them in their unflexed positions and substantially flush with the walls of the casing. The said springs are provided with the inwardly extending buttons 31 and 32, respectively, adapted for operative engagement with the sides of the tube.

To place the tube within the casing forming part of this structure, the two halves of the container are swung apart on their hinge 18, and the tube inserted so that the neck portion 14 fits into the opening 12, the lower terminal portion of the tube being inserted into the slot 22 of the key 21. The container is then closed by swinging together the two halves thereof, the latch 19 serving to detachably hold both sections together, and the knob 23 is rotated slightly so as to produce a turning up of the bottom of the tube for proper operative engagement with the key.

In the operation of this device, the cap 17 is removed and an inward pressure applied with the fingers against the diaphragms 27 and 28, thereby causing the buttons 31 and 32 to operatively engage the sides of the tube 10, against the action of springs 29 and 30, to force the contents of the tube outwardly through the terminal portion 13. Upon a release of the pressure, the said springs will cause the said diaphragms to return back to their original positions. Should the contents of the tube at the point thereof where the pressure of the said buttons is applied be entirely ejected, a rotary manipulation of the key 21 in an upward direction will result in a forcing of the said contents up to the level of the said apertures. In this manner, the upper portion of the tube, where pressure is applied, can at all times during the useful life of the tube be provided with a sufficient quantity of the contents for effecting a proper ejection thereof as above described.

It will be noted that the arrangement is such as to provide a handy and convenient means of dispensing the contents of the tube at all times, inasmuch as the container proper remains unmutilated and unaltered. It will also be observed that the key 21 is not used for the purpose of effecting the ejection of the contents from the tube, but merely for the purpose of storing such contents at the point where pressure is to be applied, thereby rendering the operation relatively simple. The only operative step in causing an ejection of the said contents is the operation of applying pressure to the said diaphragms.

Inasmuch as, in this form of my invention, the neck of the outlet portion of the tube is specifically designed to fit the opening 12 of the casing, no other tube can be used with this container except one specifically made for the purpose, thereby providing an incentive to purchasers to buy tubes produced by the manufacturer of this container. Where the container is to be of a permanent nature, it can be made of metal, bakelite or other suitable material, and of attractive design, and the sides thereof may have printed or impressed thereon any desired advertising matter. As the tube has a flat base, it is adaptable to be set and maintained at all times in an upright position, so that it may be conveniently stored in a shelf or other suitable place for ready use.

In Figure 4 is shown a modification of my invention, the container proper 33 being of one piece and being fitted with the cover 34. The threaded outlet portion 35 of the tube 36 is first inserted in the upper opening of said cover 34, so that the said terminal portion protrudes therefrom, and then the cap 37 is screwed into place. In this position the cover cannot become detached from the tube, inasmuch as the shoulder 38 of the tube prevents a downward movement of the cover, and the bottom edge 39 of the cap prevents an upward movement thereof, said bottom edge being abuttable with the uppermost edge of the cover. The tube 33 is provided with oppositely positioned parallel vertical slots in the lateral sides thereof, and along which the key 40 is movable by a turning of the knob 41.

To place the cover-tube assembly into the container, the slotted key 40 is raised to a point near the top of the casing to facilitate the insertion of the bottom of the tube into the slot of the key; and then the entire assembly is lowered and the cover 34 slipped over the top portion of the casing 33.

In this form of my invention it will be noted that the aperture 42 is entirely open, thereby permitting the insertion of a finger therethrough to effect pressure against the tube 36. This simplified form of my invention eliminates the use of any yieldable means such as the diaphragms 27 and 28 and associated elements illustrated in Figure 1, and also enables an observer to readily see the condition of the tube within the container. By operatively manipulating the knob 41, as in the case of my preferred form, the contents of the tube are forced upwardly to the level of the aperture 42, and after the cap 37 is removed, pressure can be applied through the aperture to effect the ejection of the contents from the said terminal portion 35.

The forms of my invention hereinbefore described relate particularly to relatively permanent containers for the repeated housing and removal of collapsible tubes. In Figures 5, 6 and 7, however, I illustrate a form of container made of paper or cardboard within which the tube is originally packed by the manufacturer, the purpose of this construction being to provide an inexpensive container which will serve in place of the usual cardboard carton for a tube of this class, and simultaneously function in accordance with the above-referred-to objects of my invention, and which can be discarded with the tube after it has served its useful life.

The container 43 contains oppositely positioned flaps 44 and 45 therein, formed from the sides of the carton and preferably scored at the upper portions 46 and 47 thereof. The outlet terminal 48 of the tube protrudes from an opening in the top of the container. The container is provided with a slotted key 50, similar to that illustrated in Figures 1 and 2, and preferably though not necessarily diagonally positioned within the container, the knob 51 extending outside of the carton. This key is operable in a vertical direction within the slot 52 in the manner aforesaid, to force the contents of the tube to the level of the flaps 44 and 45. By applying pressure with the fingers to said flaps, they are moved inwardly, through the openings 55 and 56, to engage the sides of the tube and eject the contents thereof from the outlet terminal 48.

A cover 53, shown in dot-dash lines in Figure 5, is positioned over the entire carton, which is purchased in this form. When the device is ready to be used, this cover can be removed and the device operated as hereinabove described. Inasmuch as the tube is provided with the cap 54, the cover 53 can be permanently removed from the container, its only function being to keep the entire device properly sealed before delivery to a purchaser.

This invention is not limited to the specific forms herein described as other embodiments thereof can be employed within the scope of the appended claims.

What I claim is:

1. A collapsible tube container comprising, in combination, a casing for housing the tube and having at the top thereof an opening for accommodating the outlet terminal of the tube, an aperture in the casing in proximate relation to the upper portion of the tube, a flexible diaphragm stretched across and covering said aperture, and manually operated means associated with the casing and engageable with the lower portion of the tube for forcing the contents thereof upwardly to the level of said aperture.

2. A collapsible tube container comprising, in combination, a casing for housing the tube and having at the top thereof an opening for accommodating the outlet terminal of the tube, an aperture in the casing in proximate relation to the upper portion of the tube, a flexible diaphragm stretched across and covering said aperture, spring means attached to the wall of the casing and engageable with the inner surface of said diaphragm to yieldably hold it substantially flush with the wall of the casing, said spring means containing an inwardly protruding element adapted for operative engagement with the tube upon the application of inwardly directed pressure upon said diaphragm against the action of said spring means, and manually operated means associated with the casing and engageable with the lower portion of the tube for forcing the contents thereof upwardly to the level of said aperture.

3. In combination with a collapsible tube having an outlet portion containing a recessed neck of predetermined configuration, a container comprising a split casing for housing the tube and having at the top thereof an opening for accommodating the outlet portion of the tube, the walls of said opening being shaped to correspond with said neck portion and being engageable therewith to hold the tube against vertical displacement within the container, said casing consisting of two sections vertically hinged together at one side thereof and provided at the other side with detachable locking means, an aperture in the casing in proximate relation to the upper portion of the tube, a flexible diaphragm stretched across and covering said aperture, spring means attached to the wall of the casing and engageable with the inner surface of said diaphragm to yieldably hold it substantially flush with the wall of the casing, said spring means containing an inwardly protruding element adapted for operative engagement with the tube upon the application of inwardly directed pressure upon said diaphragm against the action of said spring means, a vertical slot in a lateral wall of the casing, and a slotted key extending through said slot and movable along the length thereof, said key being operatively engageable with the bottom portion of the tube and containing an externally positioned knob adapted for rotary manual manipulation.

4. A collapsible tube container comprising, in combination, a casing for housing a tube and having at the top thereof an opening for accommodating the outlet portion of the tube, a flap formed from each of two oppositely positioned lateral walls of the casing and in proximate relation to the upper portion of the tube, said flaps being movable inwardly through the apertures in said walls formed thereby and into engagement with said tube upon the application of manual pressure thereupon, the portion of the tube below said flaps being adaptable for operative manipulation for forcing the contents of the tube upwardly to the level of the flaps.

5. A collapsible tube container comprising, in combination, a casing for housing a tube and having at the top thereof an opening for accommodating the outlet portion of the tube, a flap formed from each of two oppositely positioned lateral walls of the casing and in proximate relation to the upper portion of the tube, said flaps being movable inwardly through the apertures in said walls formed thereby and into engagement with said tube upon the application of manual pressure thereupon, a vertical slot in a lateral wall of the casing and a slotted key vertically movable within said slot upon rotary manual manipulation thereof and operatively engageable with the lower portion of the tube.

BENJAMIN F. BERGMAN.